United States Patent [19]

Covarrubias et al.

[11] Patent Number: 4,913,813

[45] Date of Patent: Apr. 3, 1990

[54] FILTER SPILL PREVENTION COVER

[75] Inventors: George A. Covarrubias; G. Frank Dye, both of Greensboro, N.C.

[73] Assignee: Gilbarco Inc., Greensboro, N.C.

[21] Appl. No.: 281,844

[22] Filed: Dec. 8, 1988

[51] Int. Cl.[4] .............................................. B01D 35/00
[52] U.S. Cl. .................................... 210/232; 210/238; 210/248; 210/541
[58] Field of Search ............... 210/232, 233, 248, 251, 210/541, 542, 238

[56] References Cited

U.S. PATENT DOCUMENTS

| | | | |
|---|---|---|---|
| 1,616,577 | 2/1927 | Janette | 210/248 |
| 1,647,799 | 11/1927 | Hammer | 210/248 |
| 2,529,167 | 11/1950 | Lewis et al. | 210/248 |
| 2,568,196 | 9/1951 | Kennedy | 210/131 |
| 2,580,811 | 1/1952 | Martinsen | 222/460 |
| 2,948,452 | 8/1960 | Grogan et al. | 229/1.5 |
| 3,710,930 | 1/1973 | Owdom | 210/233 |
| 3,789,987 | 2/1974 | Malaspina | 210/232 |
| 3,973,549 | 8/1976 | Drummond | 123/198 R |
| 4,013,105 | 3/1977 | Uuskallio | 141/86 |
| 4,021,342 | 5/1977 | Schacht et al. | 210/232 |
| 4,082,125 | 4/1978 | Wilson et al. | 141/86 |
| 4,376,703 | 3/1983 | Krauss | 210/238 |
| 4,400,864 | 8/1983 | Peyton et al. | 210/232 |
| 4,451,368 | 5/1984 | Pandelena et al. | 210/238 |
| 4,552,661 | 11/1985 | Morgan | 210/232 |
| 4,642,183 | 2/1987 | Hebert | 210/248 |
| 4,702,790 | 10/1987 | Hogh et al. | 210/232 |

Primary Examiner—Richard V. Fisher
Assistant Examiner—Cynthia L. Nessler

[57] ABSTRACT

A cover for preventing the spillage of a liquid upon the removal of a filter cartridge from a filter adapter includes a collar member mounted over the filter adapter, and a housing member snap-fitted over the other end of the collar member, whereby the other end of the housing member is cut an angle for exposing a portion of a filter cartridge connected to the filter adapter, thereby permitting easy removal and installation of the filter cartridge with the spill prevention cover in place, the housing member also including along a bottom portion a drainage spout for draining away any liquid collected during removal of the filter cartridge.

22 Claims, 7 Drawing Sheets

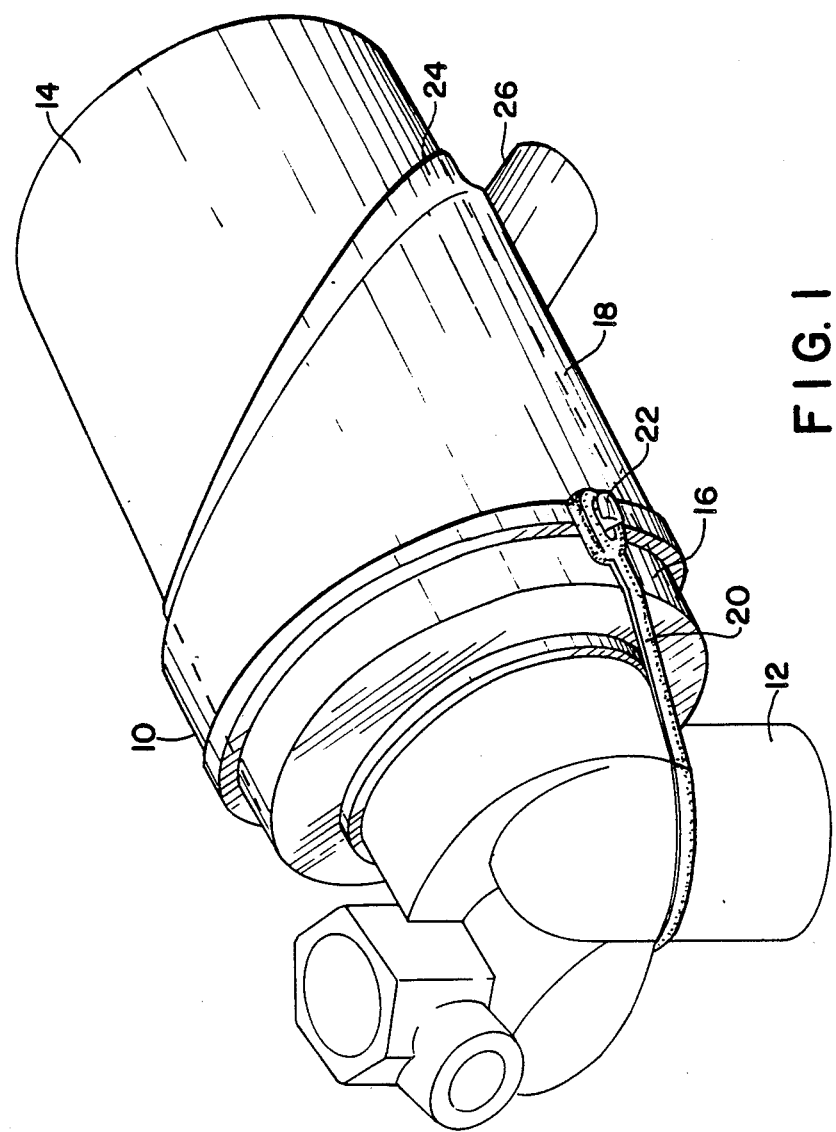

FILTER SPILL PREVENTION COVER

FIELD OF THE INVENTION

The field of the present invention relates generally to drip and/or spillage collectors for use with oil and gasoline filters, and more particularly to such spill prevention covers that wholly or partially cover a filter during use.

BACKGROUND OF THE INVENTION

In fluid pumping systems such as those for pumping or distributing gasoline, or oil, it is sometimes required that filters be utilized in the system in order to insure the purity of the product be delivered. The filters may be spin on filters, for example. When these filters must be replaced, if pressures built up in the system are not relieved, when the filter is first broken loose, spraying of the gasoline or oil may result from the area where the filter is screwed onto the filter adapter. Even if such spraying does not occur, when such a filter is broken loose fluid typically spills or drips downward from the filter connection. A typical practice in the field in order to avoid such liquid spillage is to employ open-type containers, pans, and rags, for example. Many different devices are been devised in order to overcome the spillage problem.

Kennedy, U.S. Pat. No. 2,568,196 discloses the combination of an oil filter with a rigid drip collector or cup 10 mounted about the lower portion of the filter and onto a portion of the port to which the filter is attached.

Martinsen, U.S. Pat. No. 2,580,811 discloses the use of a detachable spout having a funnel-like shape, and a spring at its upper end for hanging the spout over the outlet of a container for reducing spillage and more easily directing the flow of fluid from the container to a receiving tank.

Grogan, et al., U.S Pat No. 2,948,452 teaches a drip-catching device that slips over the bottom portion of an ice-cream cone, for catching any drippings of the ice-cream down the cone.

Drummond, U.S. Pat. No. 3,973,549 discloses a tea kettle-like container adapted for mounting below the crank case of an automobile for receiving oil dripping from the crank case. The container is designed to be easily removed from a bracket holding it in position under the crank case.

Forster, U.S. Pat. No. 4,013,105, discloses a container (see FIGS. 2, 3 and 4) for mounting over the filter neck of a gas tank of a small engine. An outlet port or drain spout 16 is provided for connection to a drainage tube 24, for draining any off any spilled fluid or fuel from the container 5.

Wilson, U.S. Pat. No. 4,082,125 discloses a hollow receptacle adapted to be mounted on a supporting ring below a fuel vent of a boat for collecting any spillage from the vent.

Krauss, U.S. Pat. No. 4,376,703 discloses a cylindrical cover for an oil filter, which cover has open ends for permitting it to be slid over an oil filter. Relative to an oil filter mounted on an engine, the innermost end of one such cover disclosed is slid over the filter, whereby the end is constructed in a bellows or thread-like fashion for permitting the cover to be screwed over an outer-threaded portion of an engine boss associated with the oil filter port. The outermost end of the Krauss oil filter cover is folded slightly inward, and includes a rib-like portion along the inside diameter of the folded over portion for providing a substantially fluid-tight seal against the outer portion of the oil filter. When a filter is unscrewed from its engine port, any oil spilling from the filter is trapped within the cover, which is removed along with the filter. After removal of the filtering cover assembly, Krauss teaches that the cover can be either cleaned for reuse or thrown away. FIG. 5 of Krauss shows an alternative embodiment for an oil filter cover that provides for outwardly-flaring sides for the cover in the lowermost portion for increase in the area within the cover for trapping spilled oil, and further includes a centrally located bellows portion.

In Pandelena, U.S. Pat. No. 4,451,368, a slip-on drip collector for a filter is shown that is fabricated from a thermal plastic material, and molded to have a band-like skirt for sealing the collector in a leak-free manner about the lower portion of a filter. The sidewalls of the collector generally flare outward in a direction towards the mounting port for the filter. Also, a cap-like member is mounted between the filter port and filter for sealing the innermost outwardly flared portion of the drip collector.

SUMMARY OF THE INVENTION

An object of the invention is to provide an improved spill prevention cover for a filter.

Another object of the invention is to provide a cover for a filter that contains spraying of liquid upon initial removal of the filter from a filter adapter or port.

Yet another object of the invention is to provide a spill preventing cover for a filter that permits ready access to the filter for removal, without necessitating removal of the spill prevention cover.

Another object of the invention is to provide an improved spill prevention cover that permits easy drainage of liquids that may spill during removal of a filter from a filter adapter.

Yet another object of the invention is to provide an improved cover for preventing spillage of liquid from a filter during removal of the latter, which cover includes a drain spout adapted for connection to a tubular manifold for draining spilled fluids from a plurality of such covers to a central receptacle.

With these and other objects in mind, the present invention includes a collar member which is mounted directly over a filter adapter, and a filter housing or body member which snap-fits over the collar piece. Drainage tube means are provided on the housing, and additional securing means is provided for maintaining the connection of the cover to the filter adapter. The body member only partially covers a filter installed on the filter adapter, thereby permitting direct access to the filter for unscrewing it or otherwise removing it from the filter adapter, without requiring detachment of the body of the spill prevention cover from the collar piece.

BRIEF DESCRIPTION OF THE DRAWINGS

The present invention will be described with reference to the appended drawings, in which like items are indicated by the same reference number, and in which:

FIG. 1 is a pictorial diagram showing one embodiment of the invention employed for use upon a filter adapter with an installed filter;

DESCRIPTION OF THE PREFERRED EMBODIMENTS OF THE INVENTION

Figure 3:
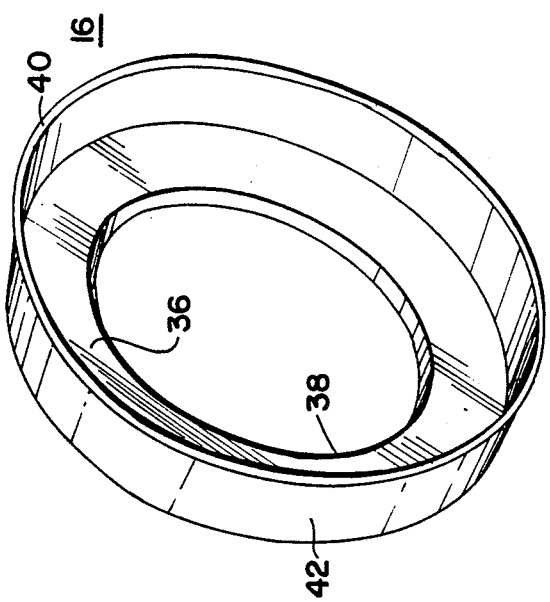
FIG. 3 is a pictorial view of a collar piece or end cap of one embodiment of the invention.

In FIG. 1, a filter spill prevention cover 10, of one embodiment of the invention is shown in used with a filter adapter 12 onto which a filter 14 is mounted. As shown, the spill prevention cover includes two sections, the first being a collar piece or member 16 which mounts over a projection of the filter adapter 12, and the second being a filter housing or enclosure 18 which snap-fits at one end over the collar member 16. To insure that the spill prevention cover 10 is not accidentally detached from the filter adapter 12, a strap 20 fabricated from a suitable material (for example, such materials may include a thermoplastic elastomer[TPE] or a rubber material impervious to gasoline, or a metal spring) is connected from a projecting lug 22 of housing 18, around the filter adapter 12, and connected at its other end to another projecting lug 22 (not shown) on the other side of the housing 18. Alternatively, the lugs 22 can be located on the collar piece 16. The length of the strap 20 is predetermined for the given application for insuring its utilization in retaining the cover 10 on the adapter 12, and the housing 18 in its snap-fit connection with the collar member 16. The housing 18 also includes a reduced opposite open end 24, that is truncated or cut at an angle, as shown, for permitting access to a sufficient portion of the body of the filter 14 for permitting the filter to be screwed into and unscrewed from the filter adapter 12 with the spill prevention cover 10 in place. The housing 18 further includes a drain spout 26 for permitting any spilled fluid, such as gasoline, for example, to be drained into a container, while the filter 14 is being removed. A container (not shown) can be placed directly under the drain tube or spout 26, or a drainage tube (not shown) can readily be attached to the drain spout or tube 26, whereby the drainage tubing is routed to a catch container (not shown). Note that the reduced end 24 of the housing 18 is dimensioned to have an inside diameter that is slightly larger than the outside diameter of the filter 14, for further permitting easy removal and installation of the filter 14. Also, the inside diameter of the end of the collar member 16 slid over the filter adapter is dimensioned to be slightly smaller than the outside diameter of that portion of the filter adapter 12, for insuring a snug friction fit therebetween. In this manner, leakage of gasoline or other fluid from the filter adapter 12 end of the collar member 16 is substantially avoided.

Figure 2:
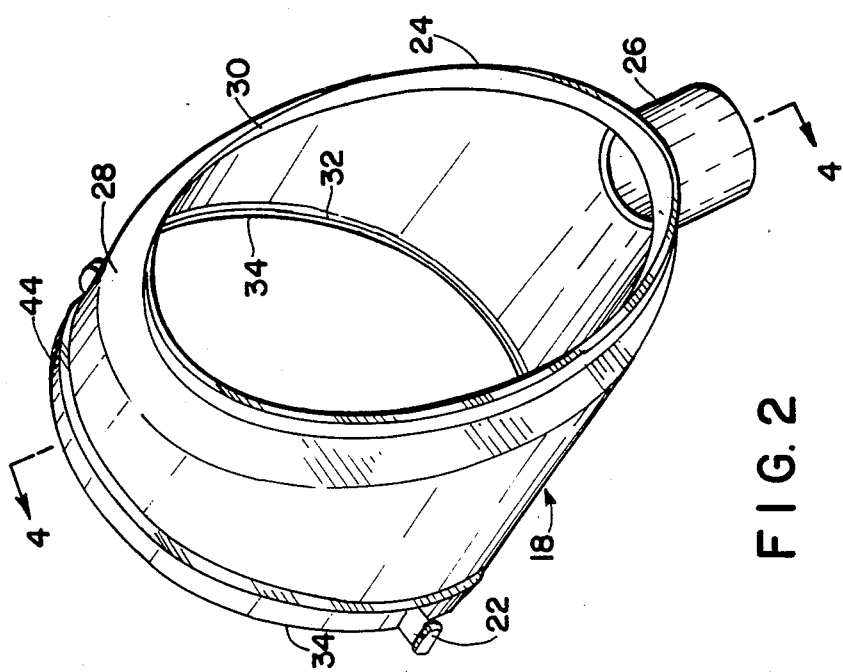
FIG. 2 is a pictorial view of a filter housing body of one embodiment of the invention.

In FIG. 2, a pictorial view of the housing 18 is shown. Note as previously mentioned that the outermost or reduced end 24 includes a sloping circumferential or radially-directed wall portion 28 which terminates to a axially-directed rim wall portion 30, as shown. The drainage spout 26 is located proximate the end 24 about a lowermost portion therof, as shown, in order to insure appropriate drainage. The drainage spout 26 can otherwise be located anywhere along the lower portion of the housing 18, but in the preferred embodiment is located as shown in order to permit the housing 18 to be tilted slightly downward for draining all of the trapped fluid out of the housing via the drainage tube or spout 26. The opposite end 34 of the housing 18 includes an interior groove 32 that is located circumferentially about the inside wall near this end 34. As will be explained in greater detail, the groove 32 is employed for accepting a projecting ridge of the collar member 16 for providing a snap-fit therebetween.

Figure 4:
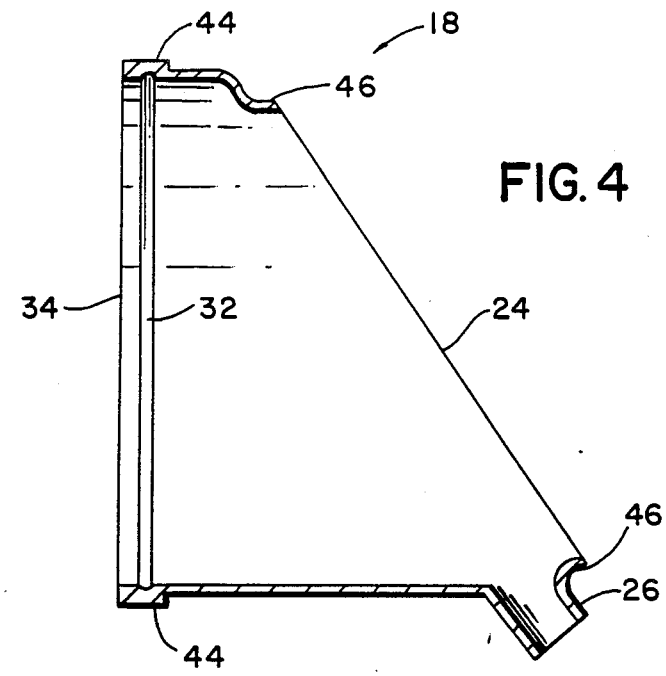
FIG. 4 is cross-sectional view of one embodiment of a filter housing of the present invention.

In FIG. 3, a pictorial view is shown of the collar member 16 as viewed from the housing 18. The collar member includes at its other end a circumferential or radially-directed wall portion 36 having a centrally-located hole 38, dimensioned for permitting the collar member 16 to be snugly slid over the filter adapter 12. A circular flange or projecting circular ridge-like member 40 is located at the other end of the collar member 16, for snapping into the groove 32 of the housing 18, as previously described. The backwall 36 and flange 40 are connected via a circular wall-like portion 42. Note that both the collar-like member 16 and housing member 18 are in this example fabricated from injection molded polypropylene. The resultant molded product is thin-walled and rigid, but because of the thin-walled construction is semi-flexible. In FIG. 4, a cross-sectional view taken along a central plane (4—4 of FIG. 2) that is axially-directed and bi-secting the drain tube 26, is shown. As shown, at the end 34 containing the groove 32, the circular wall portion 44 is thicker than the other portions of the housing 18. The opposite end 24 is cut at an angle of about forty-five degrees with the horizontal, as shown. The angular cut provides for easier installation and removal of a filter from a filter adapter 12. Also, the end 24 is a reduced end, that is reduced in diameter from the opposite end 34, via the tapering wall portions 46, as shown.

Figure 5:
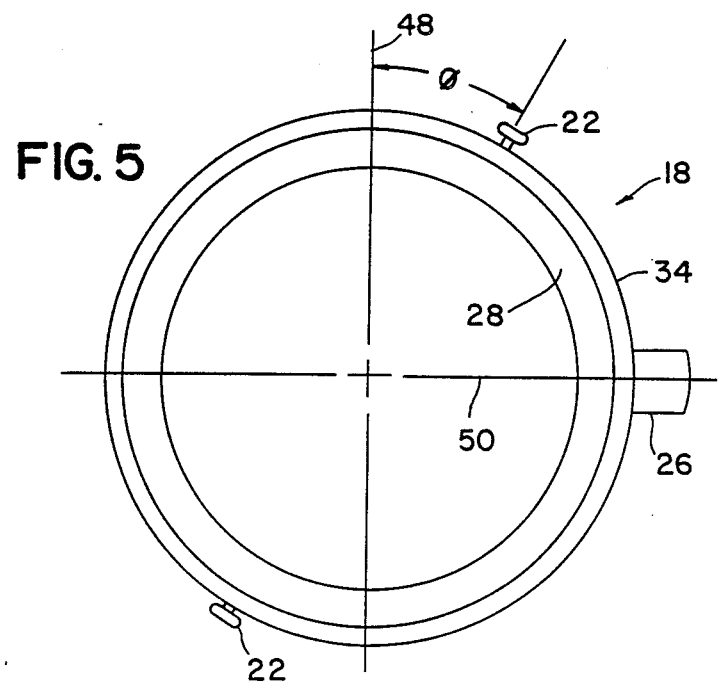
FIG. 5 is an elevation view of one end of a filter housing embodiment of the present invention.

A view of the end 34 of housing 18 is shown in FIG. 5. Note that the projecting lugs 22 are offset by an angle $\phi$ from a plane 48 that is perpendicular to an axial plane 50 bisecting the drainage spout 26. In the preferred embodiment $\phi$ is an angle of thirty degrees, for facilitating the connection of the strap 20 from the lugs 22 about the filter adapter 12, as previously described, for removably retaining the cover 10.

Figure 6:
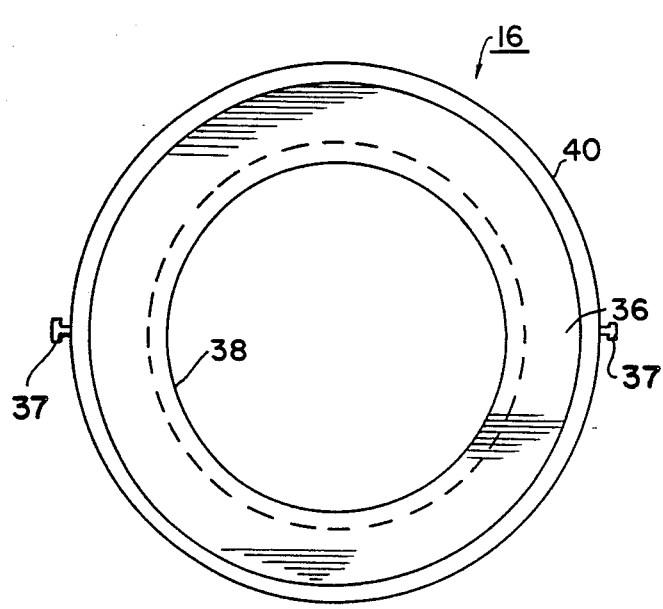
FIG. 6 is an elevational view of the front of a collar piece of one embodiment of the invention.
Figure 7:
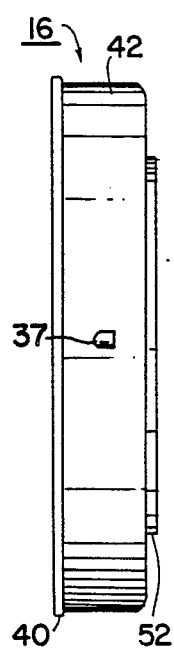
FIG. 7 is an elevational edge view of the collar piece of FIG. 6.

FIG. 6 is a front view looking towards the inside of the collar member 1. Also, FIG. 7 shows a side view of the collar member 16. Note the projecting ridge or flange 40 for mating with the groove 32 of the housing 18, as previously described. Also note the axially projecting wall portion 52 forming the hole 38 in the other end of the collar member 16. A pair of lugs 37 may be provided in addition to, or in elimination of the lugs 22 on the cover 18. The lugs 37 serve essentially the same purpose as the lugs 22, and either or both may be provided in different applications.

Figure 8:
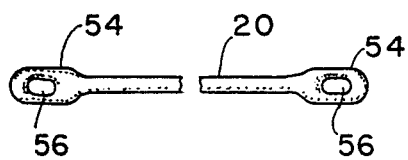
FIG. 8 is a top view of a strap of one embodiment of the invention.
Figure 9:
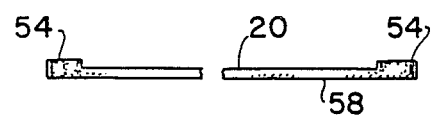
FIG. 9 is an edge view of the strap of FIG. 8.

A top view of the strap 20 is shown in FIG. 8, whereas an edge view is shown in FIG. 9. The ends of the strap 20 include widened portion 54. Oval shaped holes 56 are included in each of the widened ends 54, for permitting each end to be slipped over and retained by the projecting lugs 22 at the grooveend 34 of housing 18. Note also that the widened ends 54 of strap 20 are thicker than the central portion 58 of the strap 20, for strengthening the attachment ends 54, thereby enhancing realiability.

Figure 10:
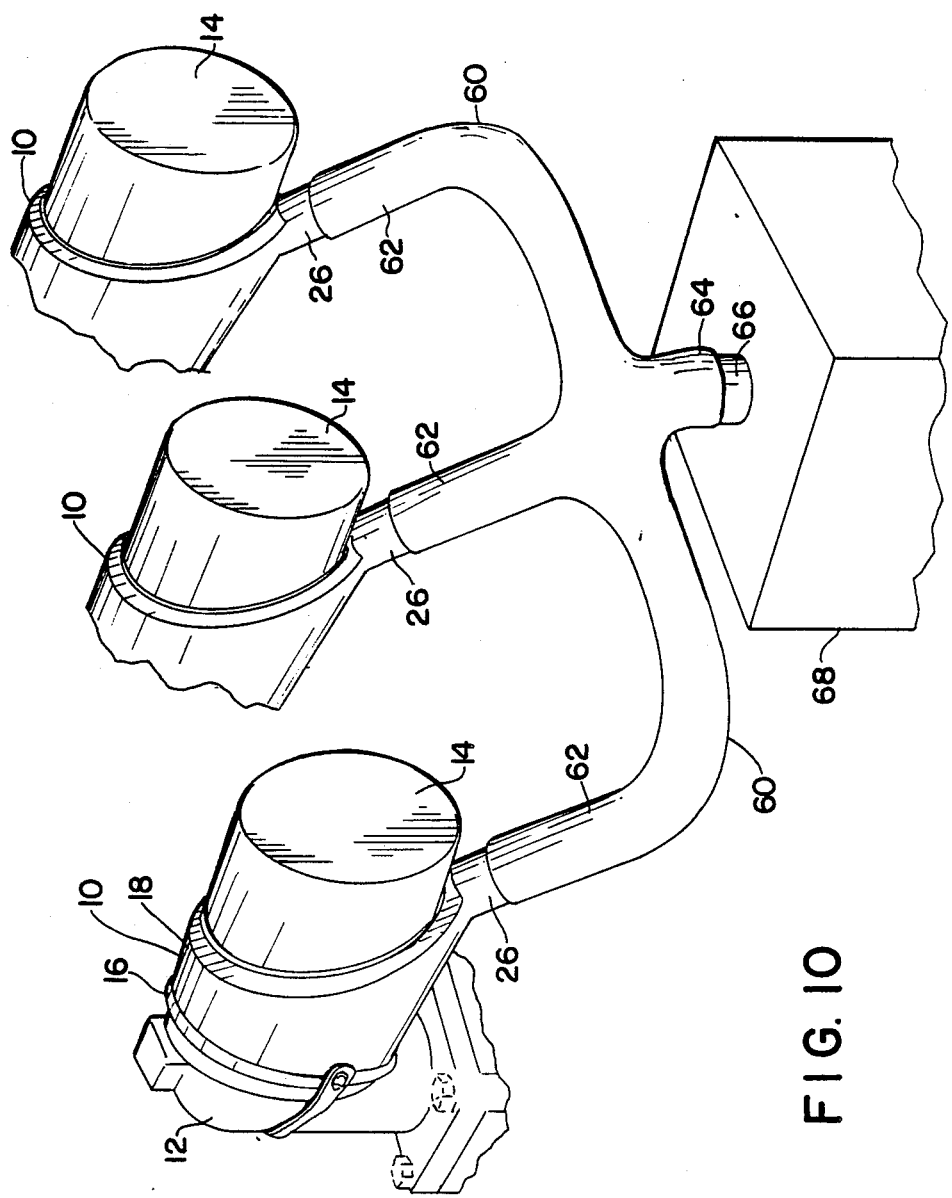
FIG. 10 is a partial pictorial view of another embodiment of the invention including a tubular manifold.

In FIG. 10, a portion of a hydraulic system including three closely located filter elements 14, in this example, employs the present spill prevention covers 10 at each filter adapter 12, as shown in the fragmented pictorial. In order to more efficiently collect the spilled fluid, such as gasoline, that is caught and collected by the covers 10, a manifold-like tubing member 60 is shown with input tube sections 62 connected to the drain spouts 26 of each one of the covers 10, and an exit tube portion 64 connected to an inlet tube 66 of a container 68. In this embodiment of the invention, through the use of such a manifold 60, spilled fluid from any one or more of a plurality of spill prevention covers 10 can readily be drained into a single container 68, as shown. The manifold 60 can be designed for adding additional finger tubes 62 for draining any desired number of spill prevention covers 10 into a single container 68, within practical limits.

Figure 11:
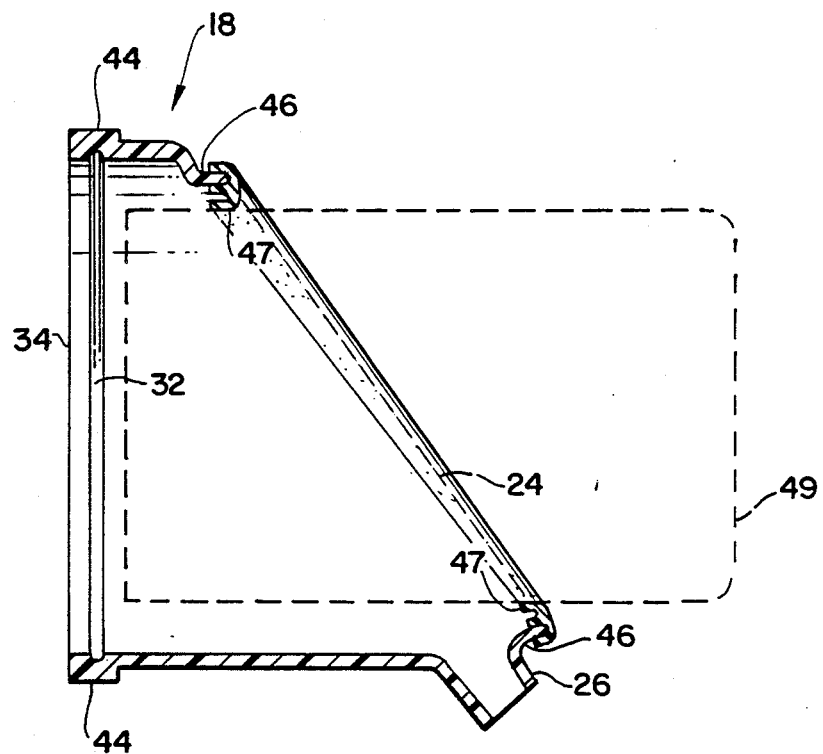
FIG. 11 is a cross-sectional view of yet another embodiment of the invention.

In FIG. 11, a rubber or elastomer gasket 47, is attached to the open end of housing 18 by, for example, a suitable adhesive, dual durometer injection molding or a snap fit onto a portion of the tapered wall section 46, as shown. The gasket 47, preferably has a relatively large amount of radial movement, or compliance, allowing a tight seal between the housing 18 and the filter housing 49 (shown in phantom), over a wide range of filter housing diameters. In this manner, effective seals are obtained for filters 49 made by different manufacturers, where the diameters of these filters 49 may vary by ¼" to ⅛"—

Figure 12:
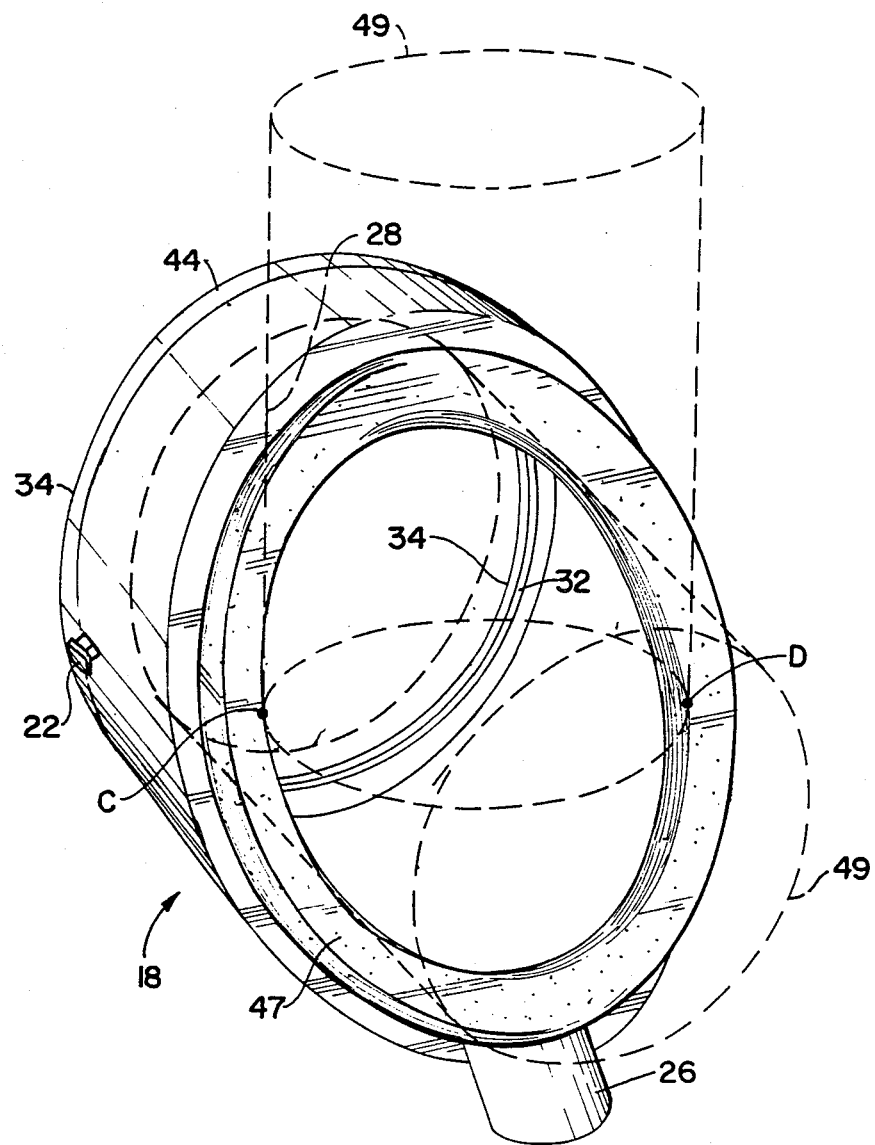
FIG. 12 is a pictorial view of a filter housing body of the embodiment of the invention of FIG. 11.

With reference to FIG. 12, as previously mentioned, a major benefit of the forty-five degree cut at the end of housing 18, is ease of installation of filters 49. There are only two points of interference (C and D) between the filter 49 and the seal 47, if the filter 49 is installed through the hole at the reduced end 24 perpendicular to the longitudinal axis of housing 18. This is because the reduced end 24 has an oval shape. After the filter 49 has passed points C and D, it can be tilted downward approximately 90 degrees so that its longitudinal axis aligns with the longitudinal central axis of installation of a filter adapter 12. When so installed, the filter 49 is in contact with the seal 47 along the entire circumference of the reduced end 24. If the hole for the seal 47 was circular, installation of a filter would be difficult without an installation aid.

Although various embodiments of the invention have been particularly illustrated above, such description and illustrations are not meant to be limiting, and other variations of the invention may be recognized by those of ordinary skill in the art, which variations are meant to be covered by the spirit and scope of the appended claims.

We claim:

1. A cover for a filter cartridge installed on a filter adapter in a liquid filter assembly, for catching liquid spray and spillage during removal of the filter cartridge, said cover comprising:
    a cylindrically shaped enclosure for enclosing at least an inner portion of said filter cartridge, said filter cartridge enclosure including a partially closed inner end forming a hole slightly less in diameter than the outside diameter of a filter cartridge mounting end of said filter adapter, for permitting the inner end to be slidably mounted on said filter adapter with a friction fit for substantially avoiding leakage of liquid therebetween, said enclosure further including an inclined outer open end truncated at an angle relative to the longitudinal axis thereof with its maximum length being defined as that of a bottom portion, the top portion being less in length than the bottom portion, said outer end having an opening slightly greater in diameter than that of said filter cartridge; and
    a downwardly projecting drain spout located in a bottom portion of the wall of said enclosure for connection to a drainage tube for drawing off liquid spilled or dripped into said enclosure during removal of said filter cartridge from the associated filter adapter.

2. The filter cartridge cover of claim 1, wherein the maximum length of said enclosure is less than that of said filter cartridge as mounted on said filter adapter, for providing in conjunction with the inclined outer open-end sufficient access to said filter cartridge for permitting its easy installation and removal.

3. The filter cartridge cover of claim 1, wherein said inclined open outer end is of reduced diameter relative to the main body of said enclosure, the reduced diameter being slightly greater than the outside diameter of said filter cartridge.

4. The filter cartridge cover of claim 1, wherein said inner end includes a ring-like band forming the circumference of said hole.

5. The filter cartridge cover of claim 1, further including:
    manifold tubing means including a plurality of intake tubing ports for connection to each drainage tube, respectively, of a plurality of said filter cartridge covers mounted on closely situated associated filter adapters, and further including an exit port tube below said intake tubing ports, for draining to a central receiver fluids from said plurality of said filter cartridge covers.

6. The filter cartridge cover of claim 1, further including:
    a pair of projecting lugs located on opposite outer sides of said filter enclosure proximate said inner end; and
    a strap having eyelet-like ends for mounting over said pair of projecting lugs, respectively, for removably securing said enclosure to said filter adapter.

7. The filter cartridge cover of claim 6, wherein said filter enclosure with said drain spout and said pair of projecting lugs are fabricated in one piece from injection molded polypropylene.

8. The filter cartridge of claim 6, wherein said strip is fabricated from a thermoplastic elastomer material.

9. The filter cartridge cover of claim 1, wherein said outer open end is of reduced diameter relative to the diameter of a main portion of said enclosure, but of slightly greater diameter than the outside diameter of said filter cartridge, and has a narrow band-like surface about the circumference of the associated opening.

10. The filter cartridge cover of claim 9, further including an elastomer gasket mounted on the narrow band-like surface about the outer open end of said cover for providing a relatively tight seal between the latter and a filter cartridge installed through said cover.

11. The filter cartridge cover of claim 1, wherein said filter enclosure consists of two pieces including:
   a relatively narrow annular collar providing said inner end, and an opposite open first mating end having a raised rim formed about the outer circumference thereof; and
   a relatively elongated housing providing said outer end, and an opposite open second mating end slighly greater in diameter than said first mating end of said collar, including a circular groove about the inside surface thereof proximate said second mating end, whereby said groove accepts said rim of said first mating end of said collar, for permitting said second mating end to be snap-fitted over said first mating end, for connecting said collar and housing pieces together to form said cover, said drain spout being located on said housing.

12. The filter cartridge cover of claim 11, further including:
   a pair of outwardly projecting lugs located on opposite outer sides of said housing; and
   a strap having eyelet-like ends for mounting over said pair of projecting lugs, respectively, for removably securing the mated combination of said collar and said housing to said filter adapter.

13. A cover for a filter cartridge installed on a filter adapter in a liquid filter assembly, for catching liquid spray and spillage during removal of the filter cartridge, said cover comprising:
   an annular collar formed from a narrow cylinder completely open at an outer end, and partially closed at an opposite inner end to form a hole slightly less in diameter than the outside diameter of a filter cartridge mounting end of said filter adapter, for permitting said collar to be slidably mounted on said filter adapter with a friction fit substantially avoiding leakage of liquid therebetween;
   a housing for said filter cartridge formed from a cylinder having an inner end slightly greater in inside diameter than the outside diameter of said outer end of said collar for mounting thereover, and an inclined open outer end truncated at an angle relative to the longitudinal axis thereof with its maximum length being defined as a bottom portion, and including a downwardly projecting drainage spout located along the bottom portion; and
   means for snap-fitting the inner end of said housing over the outer end of said annular collar, whereby the combined maximum length of said collar and housing is shorter than said filter cartridge, thereby permitting easy installation and removal of said filter cartridge on said filter adapter, while said cover is installed on said filter adapter.

14. The filter cartridge cover of claim 13, wherein said snap-fitting means includes:
   a raised rim about the outer circumference of the outer end of said annular collar; and
   a circular groove within the inside circumference of the inner end of said housing, said circular groove being dimensioned for receiving said raised rim of said annular collar.

15. The filter cartridge cover of claim 14, further including:
   a pair of outwardly projecting lugs on opposite sides of said housing; and
   a strap having eyelets at opposite ends for mounting over said pair of projecting lugs, respectively, for removably securing the mated combination of said collar and said housing to said filter adapter.

16. The filter cartridge of claim 15, wherein said collar, and said housing with said outwardly projecting lugs and drain spout, are each fabricated in one piece, respectively, from injection molded polypropylene.

17. The filter cartridge cover of claim 15, wherein said strap is fabricated from thermoplastic elastomer material.

18. A cover for a filter cartridge installed on a filter adapter in a liquid filter assembly, for catching liquid spray and spillage during removal of the filter cartridge, said cover comprising:
   an annular collar formed from a narrow cylinder completely open at an outer end, and partially closed at an opposite inner end to form a hole slightly less in diameter than the outside diameter of a filter mounting end of said filter adapter, the circumference of the hole being formed into a band-like portion, for permitting said collar to be slidably mounted on said filter adapter with a friction fit for substantially avoiding leakage of liquid therebetween, the outside circumference of the outer end being formed into a narrow raised rim;
   a cylindrically-shaped housing for said filter cartridge having an inner end slightly greater in inside diameter than the outside diameter of said outer end of said collar for mounting thereover, with a circular groove being formed proximate and about the inside surface of the inner end for snap-fitting over said narrow raised rim at the outer end of said collar, said housing also having an inclined outer open end of reduced diameter relative to the body of said housing, truncated at an angle relative to the longitudinal axis thereof with its maximum length being defined as that of a bottom portion, the opening of the inclined outer end being slightly greater in diameter than said filter cartridge, and terminated to form a narrow band-like surface about the circumference;
   a downwardly projecting drain spout located along the bottom portion of said filter housing proximate the outer end thereof;
   a pair of outwardly projecting lugs located on opposite outer sides of said filter housing proximate said inner end thereof; and
   a strap having eyelet-like ends for mounting over said pair of projecting lugs, respectively, for removably securing the mated assembly of said collar and filter housing to said filter adapter.

19. The filter cartridge cover of claim 18, wherein said annular collar, and the combination of said housing, drain spout, and projecting lugs, are each fabricated in one piece from injection molded polypropylene.

20. The filter cartridge cover of claim 18, further including sealing means mounted upon the circumference of said narrow band-like surface of the inclined open end of said housing, for providing a relatively tight seal between the latter and a filter cartridge installed through said cover.

21. The filter cartridge cover of claim 20, wherein said sealing means consists of an elastomer gasket.

22. The filter cartridge cover of claim 21, wherein said sealing means consists of a rubber gasket.

* * * * *